United States Patent [19]

Halstead et al.

[11] 4,163,939

[45] Aug. 7, 1979

[54] ANTI-STATIC PLASTIC ENCLOSURE FOR ELECTRIC UTILITY METERS

[75] Inventors: Kenneth G. Halstead; James D. Hawfield, Jr., both of Raleigh, N.C.

[73] Assignee: Westinghouse Electric Corp., Pittsburgh, Pa.

[21] Appl. No.: 875,668

[22] Filed: Feb. 6, 1978

[51] Int. Cl.² .............................................. H02B 9/00
[52] U.S. Cl. ................................... 324/104; 324/156; 361/220; 361/372; 361/364
[58] Field of Search ....................... 324/110, 156, 104; 361/212, 216, 220, 364–375

[56] References Cited

U.S. PATENT DOCUMENTS

| | | | |
|---|---|---|---|
| 2,346,483 | 4/1944 | Goss | 361/220 |
| 3,133,247 | 5/1964 | Sherman | 324/104 |
| 3,441,852 | 4/1969 | Hallenbeck | 324/156 |
| 3,955,021 | 5/1976 | Cleavenger | 324/156 |

*Primary Examiner*—Gerald P. Tolin
*Attorney, Agent, or Firm*—R. W. Smith

[57] ABSTRACT

An electric utility meter includes a detachable anti-static plastic cover having an electroconductive layer on the cover front face. The conductive layer extends between the cover and a dial pointer of the meter. An electric contact projects into the interior of the cover so as to make contact with the meter chassis when the cover is assembled to the meter.

6 Claims, 6 Drawing Figures

ANTI-STATIC PLASTIC ENCLOSURE FOR ELECTRIC UTILITY METERS

BACKGROUND OF THE INVENTION

This invention relates to an electric utility meter including a detachable anti-static plastic cover and more particularly to such a cover having an integral contact positioned for connection with the meter chassis by assembly of the cover to the meter.

In electric utility metering, one type of meter often used is a kilowatt demand meter of the type including an elongated or needle type pointer that is movable over a wide arcuate space at the front of the meter relative to a dial having watt demand scale markings. The demand meters are of two general types, one includes a mechanical register type and the other includes the thermal type of demand meter. Illustrative examples of the former type are described in U.S. Pat. Nos. 3,136,947 and 3,207,985. An example of a thermal demand meter is described in U.S. Pat. No. 3,133,247. The aforementioned type of meters are housed in watthour meter type enclosures including a base carrying a meter chassis including the metering movement and a cup-shaped transparent cover detachably mounted to the meter base. Meter covers made of glass are more commonly used, however covers made of plastic are increasing in use. An example of a plastic meter cover capable of being adapted for use with demand meters is disclosed in U.S. Pat. No. 3,846,677 issued Nov. 5, 1974 and assigned to the assignee of this invention. The plastic covers offer an advantage over glass covers in being more resistant to impact and breakage.

As has been sometimes observed when demand meters are enclosed with a plastic cover, an accumulation of static electricity develops on the plastic material of the covers. Since the front face of the covers are often in close adjacent relationship to the demand meter pointers, there may be sufficient static electricity to electrostatically produce movement of the meter pointer. Any extraneously produced movement of a meter pointer is to be avoided to prevent unreliable and inaccurate meter readings. Therefore, it is desirable to provide a detachable anti-static plastic meter cover which is simple and inexpensively manufactured and which can be simply used and installed without alteration or interference in the operation of the meter.

SUMMARY OF THE INVENTION

In accordance with the present invention an electric utility meter includes an enclosure formed by a base carrying the meter chassis and a detachable plastic cover having a cup-shaped configuration. The front face portion of the cover is positioned adjacent an elongated dial pointer of the meter and is provided with an electroconductive layer capable of conducting electrostatic charges developed on the plastic material. A contact member is connected to the electroconductive layer and is oriented so as to project into the interior of the cover. The contact member is positioned to make electrical contact with the meter chassis when the cover is installed and to form a shunting conductive path for the electrostatic charges to a source of ground potential. Accumulation of electrostatic charges is prevented to avoid interference by such charges on the meter pointer.

In one preferred form of the present invention the meter cover includes an electroconductive layer that is formed by a pattern of wire molded into the front face with a contact member being formed by a strip of wire which is connected to the wire pattern and projects therefrom into engagement with the meter chassis. In another preferred form of the present invention, the cover includes a detachable static shielding plate formed by a transparent disc having a pattern of wire wound thereon to form a conductive layer and terminating at one end with a predetermined length of extending spring contact wire having a free end projecting into the interior of the cover. The extending contact wire end is resiliently biased into electrical contact with a meter chassis upon assembly of the cover to the meter. The disc fits against the interior side of the cover front portion and is capable of being held in place by the demand meter reset mechanism. The static shielding plate is easily assembled and disassembled from a conventional plastic meter cover to provide the cover with an anti-static feature in accordance with the present invention.

Other features and advantages of the present invention will be more apparent from the detail description of the drawings.

DETAIL DESCRIPTION OF THE PREFERRED EMBODIMENTS

Figure 2:
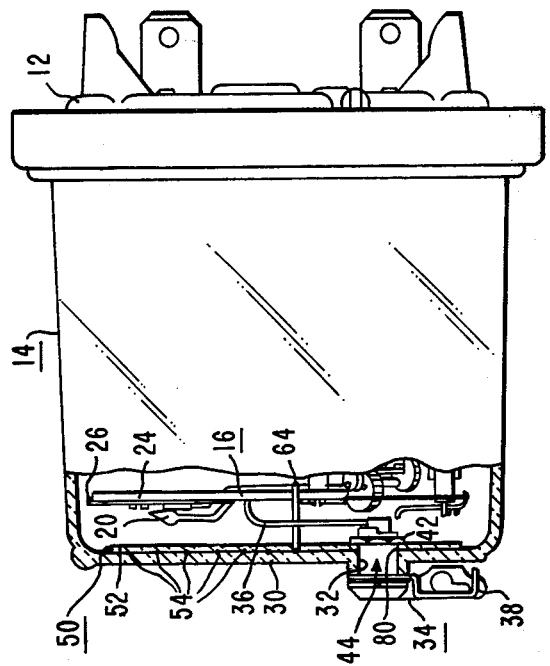
FIG. 2 is a side elevational view of the meter shown in FIG. 1 with parts broken away.
Figure 1:
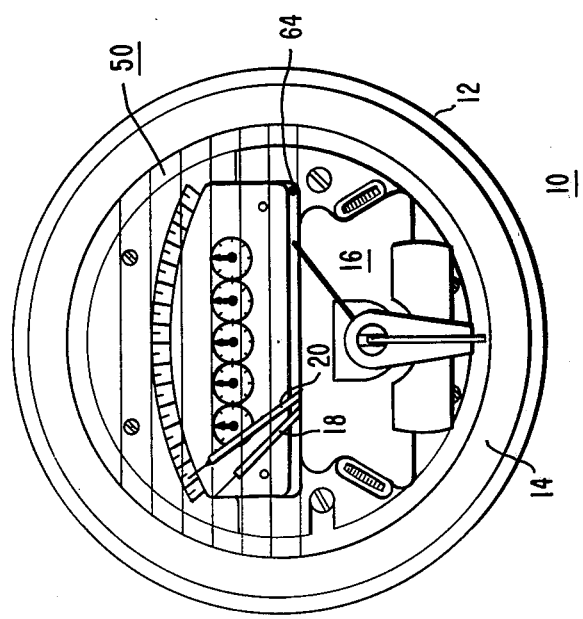
FIG. 1 is a front elevational view of an electric utility meter having an anti-static plastic cover made in accordance with the present invention.

Referring now to the drawings and more particularly to FIGS. 1 and 2, there is shown an electric utility meter 10 of a kilowatt demand type described further hereinbelow. The meter 10 includes a two-part enclosure formed by a base 12 and a detachable anti-static plastic cover 14 made in accordance with the present invention. The base 12 carries the meter mechanism or chassis 16 including a meter movement. For purposes of the description of the present invention and not limiting the present invention, the chassis 16 includes a thermal demand watthour meter movement which may be of the type DSH available from the assignee of this invention, Meter Department, Raleigh, N.C. The meter chassis 16 includes two elongated dial pointers 18 and 20, one for indicating the existing and the other the maximum KW demand, which are extremely sensitive and are mounted in low friction bearings. The stability of pointers 18 and 20 is a critical factor in the meter's accuracy. The thermal demand watthour meter chassis 16 includes conventional meter movement parts, the details of which do not form a part of this invention, and include a frame, not shown, usually made of an aluminum casting. The frame carries voltage and current sections, a rotating shaft and disc assembly, a watthour dial register and a thermal demand section pivotally carrying the dial pointers 18 and 20. A dial plate 24, usually made of sheet aluminum, and a scale plate 26, usually made of the same aluminum sheet material, are mounted on the front of the meter frame. Accordingly, substantial portions of the meter chassis 16 are formed of conductive materials which are innerconnected so that they form a source of ground potential and such characteristic is utilized in the present invention for isolating and protecting the delicate pointers 18 and 20 from static electricity, as described further hereinbelow.

Referring further to the general arrangement of the electric utility meter, the cover 14 is made of a suitable molded plastic composition preferably a polycarbonate plastic composition including ultraviolet inhibitor constituents. The cover 14 is a modified form of the cover described in the aforementioned U.S. Pat. No. 3,846,677. The front face portion 30 is made substantially flat and includes the circular hole 32 receiving a reset mechanism 34 as described and claimed in U.S. Pat. No. 3,059,181 issued Oct. 16, 1962 and assigned to the assignee of this invention. As described in the last named patent, the reset mechanism 34 is adapted to engage the pointer 20 with an internal finger 36 externally rotated by an arm 38. In accordance with the operation of maximum demand meters, the maximum demand indicating pointer 20 is driven up scale during a billing period and remains at a given position until reset by means of the reset mechanism 34, typically at the end of the billing period. The reset mechanism 34 is held in place at the cover front face 30 by a locking nut 42 threaded to the back of a hollow externally threaded shaft portion 44 of the mechanism 34 extending through the hole 32.

Figure 3:
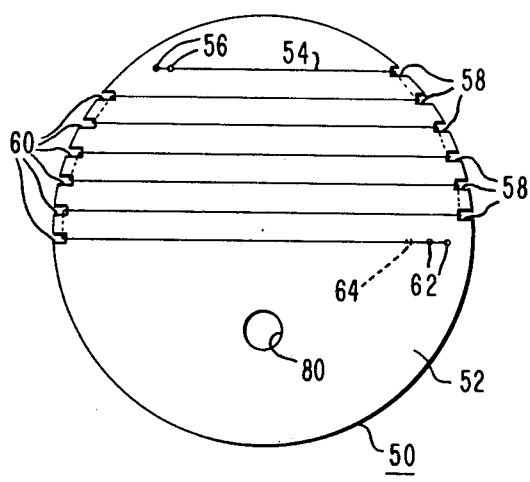
FIG. 3 is a front elevational view of a static shielding plate included in the cover shown in FIGS. 1 and 2.
Figure 4:
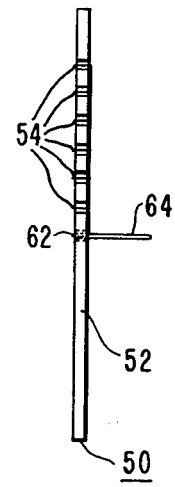
FIG. 4 is a side elevational view of the static shielding plate shown in FIG. 3.

To protect and isolate the pointer 20 from static electricity charges which may accumulate on the cover 14, since it is made of a plastic composition susceptible to the accumulation of such charges, a static shielding plate 50 is mounted on the interior side of the cover front portion 30. FIGS. 3 and 4 show the static shielding plate separated from its cover mounted position shown in FIGS. 1 and 2. A disc 52 preferably made of a transparent plastic material caries an electroconductive layer formed by a small diameter wire 54 formed into a pattern which covers the front dial portion of the meter 10 including the extent of arcuate movement of the pointers 18 and 20. The wire 54 in one preferred embodiment is made of a fine or small diameter stainless steel wire material having a diameter in the order of 0.005 inch (0.013 cm). The wire 54 is held in place at one end at holes 56 in the disc 52 and is wound in physically parallel paths across the disc. Side notches 58 shown on a right hand side of the disc in FIG. 3 receive the wire 54 as do the side notches 60 shown along the left hand edge of the disc. The mutually aligned notches 58 and 60 retain the wire 54 in parallel paths as shown in FIG. 3. It has been found that the distance between the parallel paths of the wire 54 is preferably in the order of 0.4 inch (1.02 cm) so that the shielding plate conductivity is effective without significantly impairing visibility in viewing of the meter pointers when viewed through the cover front face portion 30.

Holes 62 receive a last turn of the pattern of the wire 54. A straight length of terminal contact wire 64 is connected to the lower end of the wire 54 so as to extend from the interior side of the cup 14 when the plate 50 is assembled to the inside of the cover front face 30 as shown in FIG. 2. The contact wire 64 has a predetermined length and is preferably made of spring wire such as stainless steel having a suitable larger diameter than the fine wire 54 so as to be resilient. The wire 64 is integral with wire 54 and forms spring wire contact member for resiliently engaging a conductive portion of the meter chassis 16. The spring wire contact member 64 is shown in FIG. 2 as it extends into the area of the chassis 16 and engages the dial plate 24.

Figure 5:
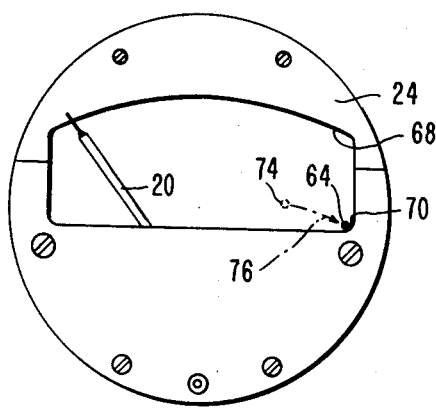
FIG. 5 is a diagramatic view illustrating the operative relationship of internal parts of the meter shown in FIGS. 1 and 2.

FIG. 5 shows the dial plate 24 separate from the meter shown in FIG. 2 wherein the dial plate has a window portion 68 through which the pointer 20 extends. The window corner edge 70 of the plate 24 is resiliently engaged by the contact member 64 to have electrical contact therewith. The resiliency of the spring wire material of the contact member 64 biases it into engagement with the corner edge 70. The contact engaging relationship between the contact member 64 and the dial plate 24 provides an important feature of the present invention.

The cover 14 is detachable from the base 12 as described in the aforementioned U.S. Pat. No. 3,846,677 and when it is reassembled to the base the contact member 64 will be oriented so that the inherent attaching positioning of the cover, which requires the cover 14 to be rotated in a front viewed clockwise direction, the contact member 64 will be rotated into engagement with the corner edge 70 and held in place by the resiliency of the spring wire material of the contact member. For example, when the cover 14 is initially oriented relative to the base 12 for mounting, the contact member 64 will have an initial position indicated at 74 in FIG. 5 and will be rotated in the direction of the directional arrow 76 into contacting engagement with the dial plate 24 at the corner edge surface 70.

To convert a conventional demand meter plastic cover into the anti-static plastic cover of this invention, the disc 52 is provided with a circular opening 80 shown in FIG. 3 substantially identical to the circular opening 32 in the cover front face 30. The flat side surfaces of the disc 52 conform to the substantially flat interior surface of the cover front face 30 and the diameter of the disc is made so that it fits in mating size to the cover front face. The disc 52 is assembled so that the front surfaces of the wire 54 contact the interior of the front face throughout the area thereof to be protected with the hole 80 aligned with the circular hole 32. The reset mechanism 34 is then assembled to the combined static shielding plate 50 and front face 30 so that the disc 52 is held in place when the locking nut 42 is applied to clamp the reset mechanism 34 in place. In accordance with this invention the assembly of the plate 50 to the cover 14 also orients the contact member 63 for automatically being positioned into electrical contact with the meter chassis 16 upon installation of the cover 14 to the meter base 12.

With the static shielding plate 50 in place on the front face 30 of the cover 14, static electricity charges developed on the cover are conducted to the conductive layer formed by the wire 54 and these charges are conducted to the chassis 16 through the contact member 64 since the chassis forms a source of ground potential as noted here and above. The attracting or repulsive characteristics of electrostatically produced movement on the dial pointers 18 and 20 are then avoided. The shielding plate 50 permits use of a plastic meter cover wherein the characteristics of the plastic material and the environment cause it to develop and accumulate substantial static electricity charges which otherwise interfere with the meter movement enclosed by the cover.

Figure 6:
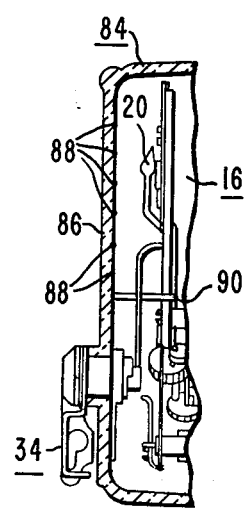
FIG. 6 is a side elevational view corresponding to FIG. 5 showing an alternate preferred embodiment of the present invention.

In an alternate embodiment of the present invention, shown in FIG. 6, an anti-static plastic meter cover 84 is substantially identical to the cover 14 except that the static shielding plate 50 is not used. The front face 86 corresponding to the front face 30 thereof has integrally attached and embedded therein an electroconductive layer 88 which can be formed by a pattern of wire 54 such as shown in FIG. 3 or by any type of suitable conductive wire mesh, or a sheet of conductive material which is also transparent. The electroconductive layer 88 is assembled into a cover mold cavity at the time the cover 84 is made by molding techniques so that the electroconductive layer is integrally molded into the front face 86. A spring wire contact member 90 is provided corresponding to the spring wire contact member 64 so that it is electrically connected to the electroconductive layer 88. The contact member 90 also projects into the interior of the cover 84 at a predetermined length and is positioned for electrically contacting the chassis 16 when the cover 84 is detachably mounted to a meter base such as base 12. It is contemplated that the contact member 64 or 90 described hereinabove can be provided by an extending wire length of the same wire material used to form the electroconductive layers 54 or 88.

While preferred embodiments of the anti-static plastic cover of this invention are described hereinabove, it is to be understood that other modifications and alterations of the invention may be made within the spirit and scope of our invention.

We claim as our invention:

1. An anti-static enclosure enclosing an electric utility meter including a chassis having conductive portions and carrying an elongated dial pointer at the front thereof, said enclosure comprising: a non-conductive base for carrying the meter chassis such that said chassis projects forwardly of said base; and a transparent cup-shaped plastic cover surrounding the forward projecting parts of the chassis carried by said base with said cover including a rear portion terminating at an open end detachably mounted to said base, and further including a closed end defining a cover front portion adjacently covering the chassis front and said dial pointer, said cover front portion including a separable static shielding plate having an electroconductive layer extending over the inside of said cover front portion at least throughout an area equal to the area of movement of said dial pointer, and said static shielding plate including a contact member projecting therefrom and terminating at a free end extending into the interior of said enclosure, said contact member having a predetermined projecting length and a predetermined position at said cover front portion, said contact member extending into electrical connection with a conductive portion of said chassis, whereby electrostatic electrical charges developed at said cover front portion are conducted therefrom by said static shielding plate and said contact member.

2. The anti-static enclosure for an electric utility meter as claimed in claim 1 wherein said contact member is formed of a spring wire connected to said electroconductive layer.

3. The anti-static enclosure for an electric utility meter as claimed in claim 1 wherein said static shielding plate includes a transparent disc having wound thereon a pattern of fine wire defining the electroconductive layer so as to have low visibility when said dial pointer is viewed, and wherein the diameter of the spring wire of said contact member is larger than the electroconductive layer wire of said static shielding plate.

4. The anti-static enclosure for an electric utility meter as claimed in claim 1 wherein said chassis includes a thermal watt demand meter movement and wherein said elongated dial pointer forms a maximum demand indicator.

5. The anti-static enclosure for an electric utility meter as claimed in claim 3 wherein said chassis includes a watt demand meter movement and wherein said elongated dial pointer forms a maximum demand indicator, and further wherein said cover front portion and said shielding plate include aligned hole openings, and still further wherein said cover includes a dial pointer reset mechanism extending through said hole openings with said static shielding plate and said reset mechanism being secured to said cover front portion by clamping means applied to said reset mechanism.

6. The anti-static enclosure as claimed in claim 5 wherein said chassis includes a dial plate having a window opening receiving said contact member after initial positioning of said cover on said base and upon rotation of said cover relative to said base into locking relationship therewith so that said contact member is positioned in electrical contacting engagement with said dial plate and maintained in said position by the resiliency of said contact member.

* * * * *